United States Patent
Kareenhalli et al.

(10) Patent No.: US 7,080,217 B2
(45) Date of Patent: Jul. 18, 2006

(54) CYCLE TYPE BASED THROTTLING

(75) Inventors: Suryaprasad Kareenhalli, Folsom, CA (US); Zohar B. Bogin, Folsom, CA (US); Gautam Loonawat, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 294 days.

(21) Appl. No.: 10/404,773

(22) Filed: Mar. 31, 2003

(65) Prior Publication Data
US 2004/0193822 A1  Sep. 30, 2004

(51) Int. Cl.
*G06F 12/14* (2006.01)

(52) U.S. Cl. .................. 711/154; 711/152; 711/156

(58) Field of Classification Search ........ 711/101–105, 711/152, 156, 163, 167; 700/299
See application file for complete search history.

(56) References Cited

U.S. PATENT DOCUMENTS

| 5,249,141 | A  | * | 9/1993  | Vandebroek et al. ........ 702/132 |
| 5,953,685 | A  | * | 9/1999  | Bogin et al. ................ 702/136 |
| 6,141,283 | A  |   | 10/2000 | Bogin et al. |
| 6,173,217 | B1 |   | 1/2001  | Bogin et al. |
| 6,373,768 | B1 | * | 4/2002  | Woo et al. .................. 365/211 |
| 6,470,238 | B1 |   | 10/2002 | Nizar et al. |
| 6,871,119 | B1 | * | 3/2005  | Samson et al. ............. 700/299 |

* cited by examiner

*Primary Examiner*—T Nguyen
(74) *Attorney, Agent, or Firm*—Jeffrey B. Huter

(57) ABSTRACT

Machine-readable media, methods, and apparatus are described to monitor and throttle issuance of transactions. In some embodiments, transactions are monitored during a monitoring window based upon cycle type. In response to determining that a threshold has been exceeded during the monitoring window, issuance of transactions during a throttling window are limited to a budget. Further, transactions issued during the throttling window consume a portion of the budget that based upon their cycle type.

21 Claims, 4 Drawing Sheets

ı # CYCLE TYPE BASED THROTTLING

BACKGROUND

Thermal specifications of computer system components may define the maximum temperature at which the component may break down, may slow down, or may fail. The temperature of a component may depend upon usage. For example, the temperature of a memory controller and/or a memory device may depend upon the rate at which the memory controller accesses the memory device. While a memory controller and a memory device may support for example a peak transfer rate of 800 MB/s, the memory controller and memory device in certain environments may be able to support a sustained transfer rate of only 500 MB/s without exceeding their thermal limits. In some computer systems, the memory controller may access the memory devices in bursts up to the peak transfer rate (e.g. 800 MB/s) but may limit or throttle accesses to the memory devices to maintain less than a supported sustained transfer rate (e.g. 500 MB/s) in order to guard against overheating.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques that attempt to satisfy thermal requirements of computer system components. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every-embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
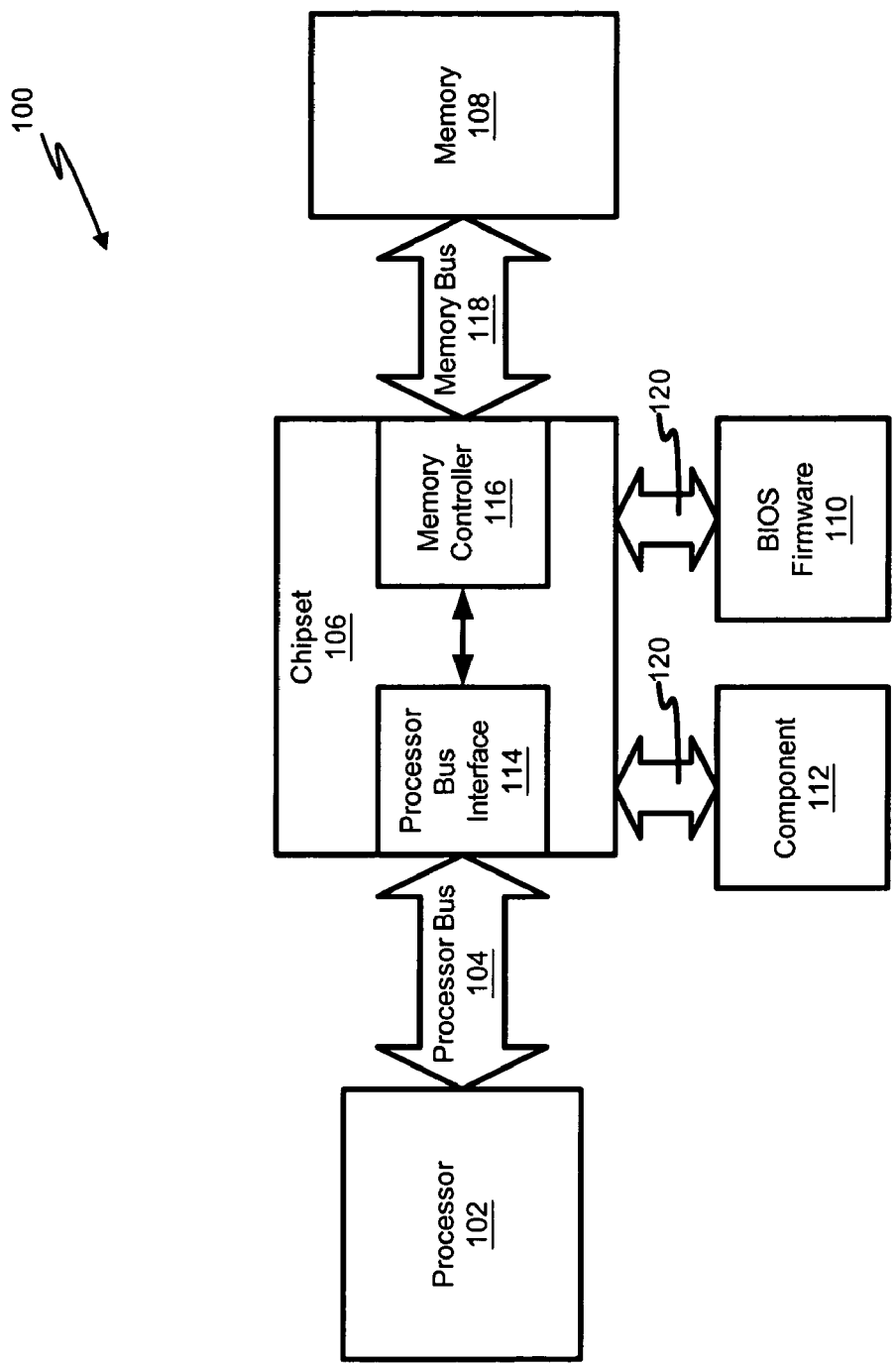
FIG. 1 illustrates an embodiment of a computing device.

An example embodiment of a computing device 100 is shown in FIG. 1. The computing device 100 may comprise one or more processors 102. The processors 102 may perform actions in response to executing instructions. For example, the processors 102 may issue transactions such as memory read transactions and memory write transactions on the processor bus 104.

The computing device 100 may further comprise a chipset 106. The chipset 106 may comprise one or more integrated circuit packages or chips that couple the processors 102 to memory 108, Basic Input/Output System (BIOS) firmware 110 and other components 112 (e.g. a mouse, keyboard, video controller, hard disk, floppy disk, etc.). The chipset 106 may comprise a processor bus interface 114 to receive transactions from the processors 102 and issue transactions to the processors 102 via the processor bus 104. The chipset 106 may further comprise a memory controller 116 to issue read and write transactions to the memory 108 via a memory bus 118. The chipset 106 may further comprise one or more component interfaces (not shown) to access the other components 112 via buses 120 such as, for example, peripheral component interconnect (PCI) buses, accelerated graphics port (AGP) buses, universal serial bus (USB) buses, low pin count (LPC) buses, and/or other I/O buses.

In one embodiment, the BIOS firmware 110 may comprise routines which the computing device 100 executes during system startup in order to initialize the processors 102, chipset 106, and other components of the computing device 100. Moreover, the BIOS firmware 110 may comprise routines or drivers which the computing device 100 may execute to communicate with one or more components of the computing device 100.

The memory 108 may comprise memory devices having addressable storage locations that the memory controller 116 may read data from and/or write data to. The memory 108 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices.

Moreover, the memory 108 may be arranged in a hierarchal manner. For example, the memory 108 may be arranged in channels, ranks, banks, pages, and columns. In particular, each channel may comprise one or more ranks, each rank may comprise one or more banks, and each bank may comprise one or more pages. Further, each page may comprise one or more columns. When accessing memory, the memory controller 116 may open a page of the memory 108 and then may access one or more columns of the opened page. For a page-hit access, the memory controller 116 may leave a page open after accessing a column of the page for a previous memory request and may access a different column of the open page. For a page-miss access, the memory controller 116 may close an open page of a bank, may open another page of the same bank, and may access a column of the newly opened page. A page-miss access generally consumes more power and therefore has a greater thermal impact than a page-hit access. For a page-empty access, the memory controller may open a closed page of a bank, and may access a column of the newly opened page for the memory transaction. A page-empty access generally consumes more power than a page-hit access but less power than a page-miss access. Accordingly, a page-empty generally has a greater thermal impact than a page-hit access but a lesser thermal impact than a page-miss access.

Figure 2:
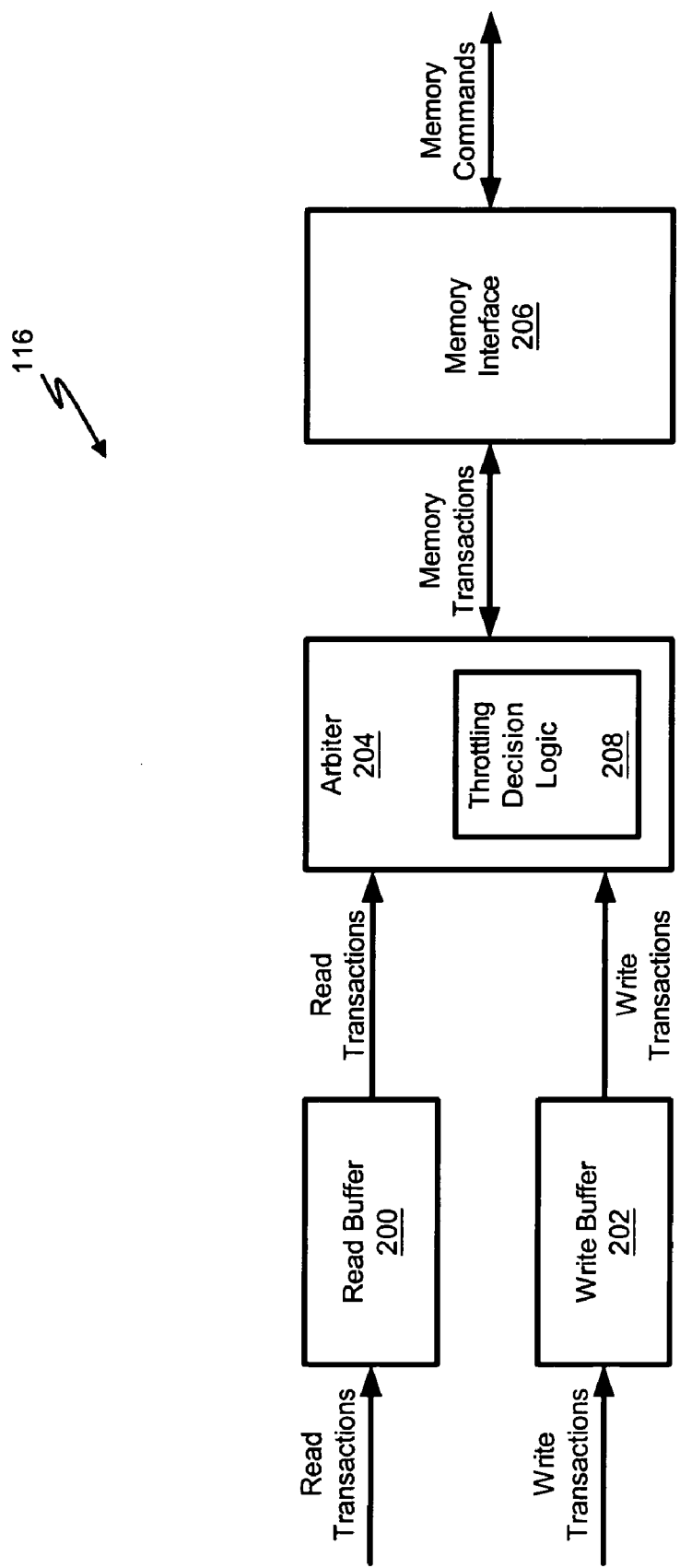
FIG. 2 illustrates an embodiment of a memory controller of the computing device of FIG. 1.

As depicted in FIG. 2, the memory controller 116 may comprise a read buffer 200, a write buffer 202, an arbiter 204, and a memory interface 206. The read buffer 200 may buffer the address and data of a read transaction until the requested data is retrieved from the memory 108 and returned to the requester (e.g. processor 102). Similarly, the write buffer 202 may buffer the address and data of a write transaction until the data is written to the memory 108. The read buffer 200 and write buffer 202 may each support buffering of one or more transactions.

The arbiter 204 may select a transaction from the buffers 200, 202 based upon various criteria and may request the memory interface 206 to service the selected transaction.

The memory interface 206 may issue one or more commands on the memory bus 118 in order to retrieve data from the memory 108 in response to servicing a read transaction. Similarly, the memory interface 206 may issue one or more commands on the memory bus 118 in order to store data to the memory 108 in response to servicing a write transaction. In particular, the memory interface 206 may decode an address of a transaction and may apply memory select signals to the memory in order to open pages of the memory 108 for reading and/or writing.

Figure 3:
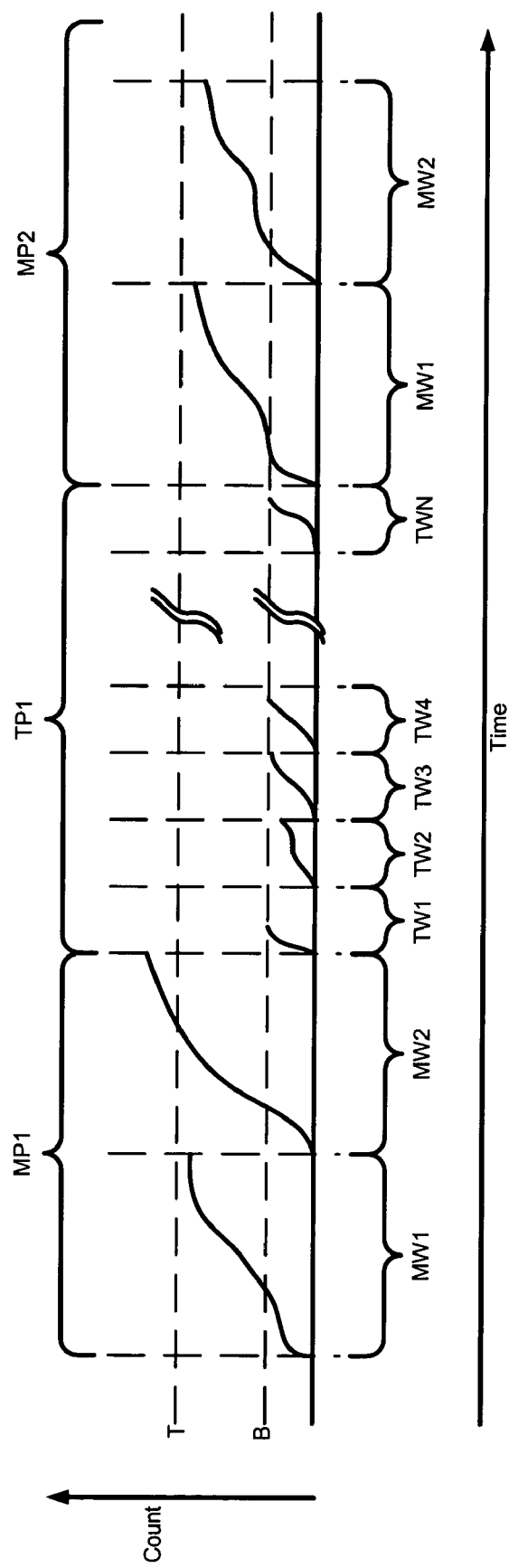
FIG. 3 illustrates monitoring periods and throttling periods of the memory controller of FIG. 2.

The arbiter 204 may further comprise throttling logic 208. The throttling logic 208 may monitor thermal specifications of the memory controller 116 and/or memory 108 based upon cycle types of transactions serviced by the memory interface 206. In particular, as depicted in FIG. 3, the throttling logic 208 may monitor transactions during monitoring periods (e.g. MP1, MP2) based upon a threshold T and may throttle transactions during throttling periods (e.g. TP1) based upon a budget B. As depicted, each monitoring period may comprise one or more monitoring windows (e.g. MW1, MW2). Similarly, each throttling period may comprise one or more throttling windows (e.g. TW1, TW2... TWN). In one embodiment, the throttling logic 208 may transition from a monitoring period to a throttling period in response to a threshold count exceeding a threshold. Further, the throttling logic 208 may transition from a throttling period to a monitoring period after a throttling period which may be defined by a timer, a number of throttling windows, or some other mechanism.

In one embodiment, the throttling logic 208 may maintain a threshold count during each monitor window that is representative of the thermal effect of the transactions during the window. Transactions of different cycle types may have different thermal effects. The throttling logic 208, therefore, may update the threshold count based upon cycle types of the transactions. For example, a read page hit may have less of a thermal impact than a read page miss. The throttling logic 208 accordingly may update the threshold count by a larger amount for a read page miss than a read page hit. Transactions of different cycle lengths may also have different thermal effects. For example, a 32 byte read may have less of a thermal impact than a 64 byte read. The throttling logic 208 may therefore update the threshold count by a larger amount for a 64 byte read than for a 32 byte read. Example count values are shown in following TABLE 1. It should be appreciated however that the count values are merely illustrative and that count values may differ from platform to platform. In particular, appropriate count values for a given platform may be determined from lab tests without undue experimentation.

TABLE 1

| CYCLE LENGTH | CYCLE TYPE | POWER VALUE | COUNT VALUE |
| --- | --- | --- | --- |
| 32B | Read Page-Hit | Prd | 0x62H |
| 64B | Read Page-Hit | 2 * Prd | 0xC4H |
| 32B | Read Page-Empty | 1.2 * Prd | 0x76H |
| 64B | Read Page-Empty | 2.2 * Prd | 0xD8H |
| 32B | Read Page-Miss | 1.6 * Prd | 0x9DH |
| 64B | Read Page-Miss | 2.6 * Prd | 0xFFH |
| 32B | Write Page-Hit | Prd | 0x62H |
| 64B | Write Page-Hit | 2 * Prd | 0xC4H |
| 32B | Write Page-Empty | 1.2 * Prd | 0x76H |
| 64B | Write Page-Empty | 2.2 * Prd | 0xD8H |
| 32B | Write Page-Miss | 1.6 * Prd | 0x9DH |
| 64B | Write Page-Miss | 2.6 * Prd | 0xFFH |

In one embodiment, the BIOS firmware 110 or some other mechanism of the computing device such as, for example, an operating system may provide interfaces and routines for defining the count values for cycle type and cycle length combinations. Moreover, the BIOS firmware 110 may provide interfaces and routines for defining the threshold for the monitoring windows, the budget for the throttling windows, the duration of the monitoring windows, the duration of the throttling window, and the duration of the throttling period. Due to its programmability, the same or similar throttling logic 208 may be incorporated into a variety of different platforms to provide adequate transaction throttling.

Figure 4:
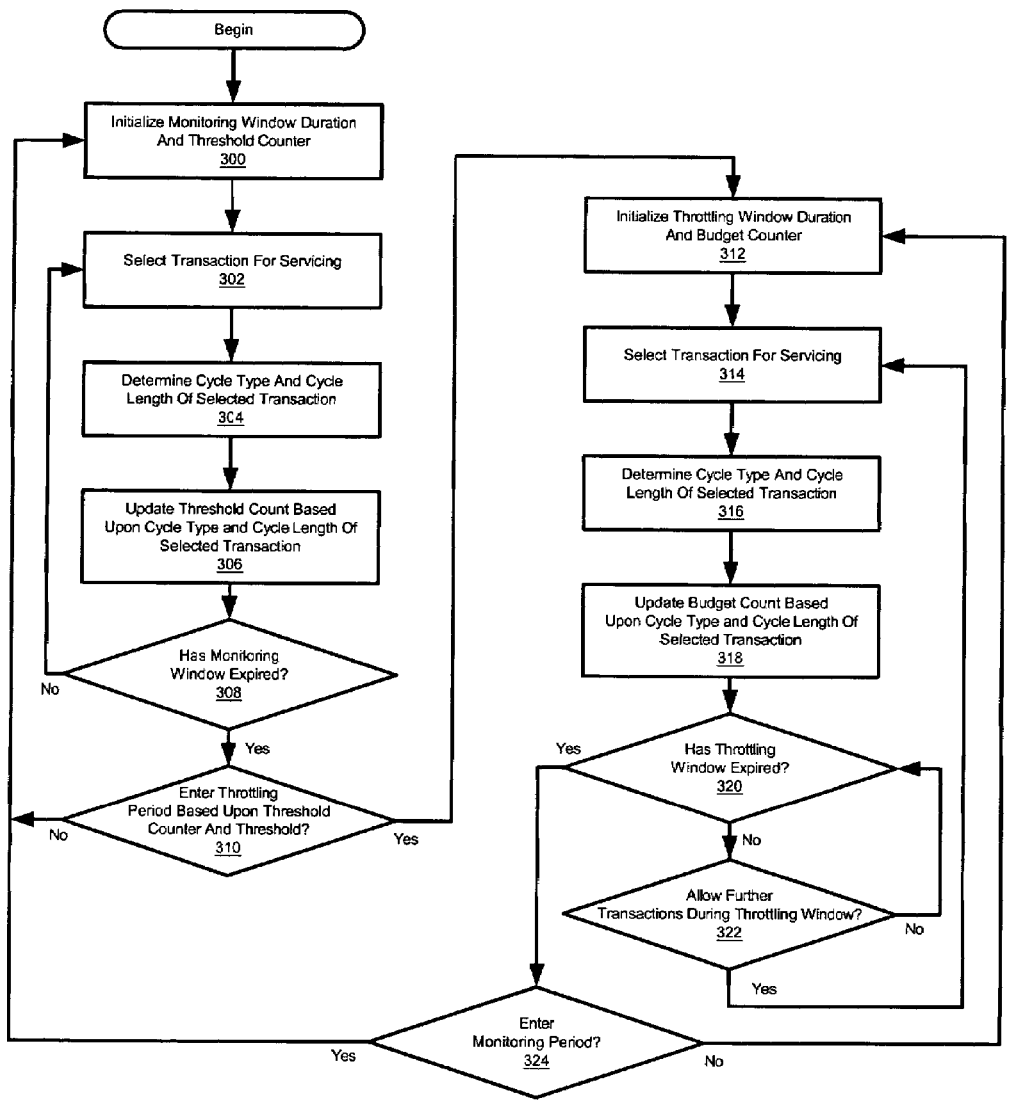
FIG. 4 illustrates an embodiment of a method that may be used by the memory controller of FIG. 2 to maintain thermal specifications via transaction throttling.

Referring now to FIG. 4, a method of throttling transactions based on cycle types is depicted. In block 300, the throttling logic 208 may initialize a monitoring window duration and a threshold count for a new monitoring window. In one embodiment, the throttling logic 208 may initialize the threshold count by clearing a counter or setting a register equal to zero in response to entering the new monitoring window. In another embodiment, the throttling logic 208 may initialize the threshold count by loading a counter or a register with an initial value based upon the threshold T of the monitoring window.

The arbiter 204 in block 302 may select a transaction from the buffers 200, 202 and provide the selected transaction to the memory interface 206 for servicing. In block 304, the throttling logic 208 may determine a cycle type and a cycle length for the selected transaction. For example, the throttling logic 208 may determine whether the selected transaction is a read page-hit, read page-empty, a read page-miss, a write page-hit, write page-empty, or a write page-miss transaction based upon the address of the selected transaction and the addresses of one or more transactions previously serviced by the memory interface 206. In block 306, the throttling logic may update the threshold count for the monitoring window based upon the determined cycle type and cycle length of the selected transaction. In one embodiment, the throttling logic 208 may increment the threshold count with the count value associated with the cycle type and the cycle length of the selected transaction. In another embodiment, the throttling logic 208 may decrement the threshold count with the appropriate count value for the selected transaction.

In block 308, the throttling logic 208 may determine whether the monitoring window has expired based upon a monitoring window timer or some other mechanism used to track the monitoring window duration. For example, the throttling logic 208 may determine that the monitoring window has expired in response to a clock cycle counter overflowing, underflowing, or containing a count value having a predetermined relationship (e.g. greater than) to a cycle count that defines the monitor window duration. In response to determining that the monitoring window has not expired, the throttling logic 208 may return to block 302 in order to select another transaction for the memory interface 206 to service during the current monitoring window.

Otherwise, in response to determining that the monitoring window has expired, the throttling logic 208 in block 310 may determine whether to exit the current monitoring period and enter a throttling period. In one embodiment, the throttling logic 208 may determine whether to enter a throttling period or to initiate a new monitoring window based upon whether the threshold count indicates the threshold T has been exceeded for the current monitoring window. In response to determining not to enter the throttling period, the throttling logic 208 may return to block 300 to initialize a new monitoring window. Otherwise, the throttling logic 208 may continue to block 312 to initialize a new throttling window.

In block 312, the throttling logic 208 may set the throttling window duration and may initialize a budget count for a new throttling window. In one embodiment, the throttling logic 208 may initialize the budget count by clearing a counter or setting a register equal to zero in response to entering the new throttling window. In another embodiment, the throttling logic 208 may initialize the budget count by loading a counter or a register with an initial value based upon the budget B of the throttling window.

The arbiter 204 in block 314 may select a transaction from the buffers 200, 202 and provide the selected transaction to the memory interface 206 for servicing. In block 316, the throttling logic 208 may determine a cycle type and a cycle length for the selected transaction. For example, the throttling logic 208 may determine whether the selected transaction is a read page-hit, read page-empty, a read page-miss, a write page-hit, write page-empty, or a write page-miss transaction based upon the address of the selected transaction and one or more transactions previously issued by the memory interface 206. In block 318, the throttling logic may update the budget count for the throttling window based upon the determined cycle type and cycle length of the selected transaction. In one embodiment, the throttling logic 208 may increment the budget, count with the count value associated with the determined cycle type and the cycle length of the selected transaction. In another embodiment, the throttling logic 208 may decrement the budget count with the appropriate count value for the selected transaction.

In block 320, the throttling logic 208 may determine whether the throttling window has expired based upon a throttling window timer or some other mechanism used to track the throttling window duration. For example, the throttling logic 208 may determine that the throttling window has expired in response to a clock cycle counter overflowing, underflowing, or containing a count value having a predetermined relationship (e.g. greater than) to a cycle count that defines the throttling window duration.

In response to determining that the throttling window has not expired, the throttling logic 208 in block 322 may determine whether to allow the arbiter 204 to provide the memory interface 206 with further transactions during the remainder of the current throttling window. In one embodiment, the throttling logic 208 may determine to prevent further transactions during the throttling window in response to determining that a budget for the throttling window has been exhausted based upon the budget count having a predetermined relationship (e.g. greater than) to the budget. In response to determining that the arbiter 204 may select further transactions for the throttling window, the throttling logic 208 may return to block 314. Otherwise, the throttling logic 208 may return to block 320 to determine whether the throttling window has expired.

In response to determining that the throttling window has expired, the throttling logic 208 in block 324 may determine whether to exit the throttling period and enter a monitoring period. In block 324, the throttling logic 208 may determine whether the throttling period has expired based upon a throttling period timer or some other mechanism used to track the throttling period duration. For example, the throttling logic 208 may determine that the throttling period has expired in response to a throttling window counter overflowing, underflowing, or containing a count value having a predetermined relationship (e.g. greater than) to a throttling window count that defines the throttling period duration.

In response to determining that the throttling period has expired, the throttling logic 208 may return to block 300 to initiate another monitoring window. Otherwise, the throttling logic 208 in block 322 may return to block 312 to initiate another throttling window of the current throttling period.

The example of FIG. 3 illustrates a monitoring period MP1 that comprises two monitoring windows MW1, MW2 and a throttling period TP1 that comprises N throttling windows TW1, TW2 . . . TWN. In one embodiment, the the monitoring windows MW1, MW2 have a duration of about 1 second and the throttling windows TW1, TW2 . . . TWN each have a duration of 10 microseconds. In general, the duration of each throttling window TW1, TW2 . . . TWN is kept relatively short to prevent long periods in which transactions are not serviced. Such long periods may result in what appears to be a non-responsive or sluggish system to a user of the computing device 100.

As shown, the threshold count in the example of FIG. 3 did not exceed the threshold T during the first monitoring window MW1. As a result, the throttling logic 208 initiated the second monitoring window MW2. During the second monitoring window MW2, the threshold count exceeded the threshold T. Therefore, the throttling logic 208 initiated a throttling period TP1 having N throttling windows TW1, TW2 . . . TWN. During throttling windows TW1, TW4 and TWN, the budget count reached the budget B prior to the completion of the respective throttling window. The throttling logic 208 accordingly prevented servicing of transaction during the remainder of these throttling windows thereby ensuring that the sustained power consumption rate during each throttling windows TW1, TW2 . . . TWN is below a level need to maintain thermal specifications for the memory controller 116 or the memory 108.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
updating a first value based upon cycle types of transactions during a monitoring window;
entering a throttling window in response to the first value and a threshold having a predetermined relationship, and
limiting transactions based upon a budget during the throttling window,
wherein updating the first value based upon cycle types comprises updating the first value based upon whether each transaction during the monitoring window is a page hit, a page empty, or a page miss.

2. The method of claim 1 further comprising determining whether the first value and the threshold have the predetermined relationship after the monitoring window has expired.

3. The method of claim 1, wherein limiting comprises updating a second value based upon cycle types of transactions during the throttling window.

4. The method of claim 1 wherein updating the first value based upon cycle types comprises updating the first value based upon whether each transaction during the monitoring window is a read page hit, a read page empty, a read page miss, a write page hit, a write page empty, or a write page miss.

5. The method of claim 4 wherein updating the first value is further based upon cycle length.

6. The method of claim 5 further comprising
programming an update value for each cycle type and cycle length combination, and
updating the first value by the appropriate update value for each transaction during the monitoring window.

7. An apparatus comprising
a buffer to store transactions,
an interface to service transactions of the buffer,
an arbiter to select transactions from the buffer for the interface to service, and
throttling logic to monitor thermal characteristics during a monitoring window based upon cycle types of transactions serviced by the interface during the monitoring time and to limit transactions serviced by the interface during a throttling window,
wherein each of the cycle types of transactions comprise a read page hit, a read page empty, a read page miss, a write page hit, a write page empty, or a write page miss.

8. The apparatus of claim 7 wherein the throttling logic updates a count during the monitoring window based upon cycle types of transactions serviced by the interface.

9. The apparatus of claim 8 wherein the throttling logic transitions to the throttling window in response to the count and a threshold having a predetermined relationship.

10. The apparatus of claim 8 wherein the throttling logic transitions to the throttling window after the monitoring window in response to determining that the count achieved during the monitoring window has a predetermined relationship to a threshold.

11. The apparatus of claim 7 wherein the throttling logic prevents the interface from issuing further transactions during a throttling window of the throttling window in response to exhausting a budget assigned to the throttling window.

12. The apparatus of claim 11 wherein the throttling logic updates a count during the throttling window based upon cycle types of transactions issued by the interface and determines that the budget has been exhausted in response to the count and the budget having a predetermined relationship.

13. The apparatus of claim 12 wherein the throttling logic updates the count based upon programmable values assigned to cycle types.

14. The apparatus of claim 12 wherein the throttling logic further updates upon programmable values assigned to cycle type and cycle length combinations.

15. A system comprising
a processor to issue read and write memory transactions,
volatile memory to retrieve data for read memory transactions and to store data for write memory transactions, and
a memory controller to receive the read and write memory transactions issued by the processor, to monitor issuance of the read and write memory transactions to the volatile memory based upon cycle types of the read and write memory transactions, and to throttle issuance of the read and write memory transactions in response to determining a threshold was exceeded,
wherein the memory controller updates a threshold count based upon each issued read and write transaction during the monitoring window based upon whether each issued read and write transaction is a page miss, a page empty, or a page hit.

16. The system of claim 15 wherein the memory controller further updates a threshold count during a monitoring window based upon cycle types of the read and write memory transactions, and enters a throttling window in response to determining that the threshold count and a threshold have a predetermined relationship.

17. The system of claim 15 wherein the memory controller further updates a budget count during the threshold window based upon cycle types of the read and write memory transactions issued to the volatile memory, and prevents further issuance of read and write memory transactions to the volatile memory in response to determining that the budget count and a programmable budget have a predetermined relationship.

18. The system of claim 15 wherein the memory controller further monitors issuance of the read and write transactions to the volatile memory based upon cycle length.

19. A machine-readable medium comprising a plurality of instructions that in response to being executed result in a computing device
   determining based upon cycle types of transactions issued during a monitoring window whether to enter a throttling window, and
   limiting issuance of transactions during the throttling window based upon a budget and cycle types of the transactions,
   wherein each of the cycle types of transactions comprise a read page hit, a read page empty, a read page miss, a write page hit, a write page empty, or a write page miss.

20. The machine-readable medium of claim 19 wherein the plurality of instructions further result in the computing device
   updating a threshold count during the monitoring window based values assigned to the cycle types of the transactions issued during the monitoring window, and
   determining based upon the threshold count whether to enter the throttling window.

21. The machine-readable medium of claim 19 wherein the plurality of instructions further result in the computing device
   updating a budget count during the throttling window based upon the values assigned to the cycle types of the transactions issued during the throttling window, and
   determining whether to prevent further issuance of transactions during the throttling window based upon the budget count.

* * * * *